Patented June 10, 1941

2,245,100

UNITED STATES PATENT OFFICE 2,245,100

METHOD OF MAKING PIGMENTED ACID RESIN EMULSION

Isidor M. Bernstein, Cincinnati, Ohio, assignor to Interchemical Corporation, New York, N. Y., a corporation of Ohio No Drawing. Application December 24, 1938, Serial No. 247,662

6 Claims. (Cl. 134—36)

This invention relates to marking and decorating compositions and to methods of manufacturing them, and has particular reference to the dispersion of pigments in compositions comprising water emulsions or solutions of organic coating compositions. Specifically, this invention refers to a method of dispersing pigment in an organic vehicle containing a film forming resin acid and a salt of said acid followed by emulsification or solution of the pigmented composition.

Acid resins such as shellac, rosin and the like have long been used as coating compositions, and in particular, have been employed as emulsions, by emulsifying the bulk of the resin by means of a salt formed by the interaction of the remaining resin with an alkali such as borax or soda ash. Rosin size and borax-shellac are typical examples of such finishes; and similar emulsions of solutions of the resins in organic solvents have been prepared.

Such coating compositions, though unusually economical and easy to handle, have not been used extensively in the pigmented form, largely because of the difficulty of obtaining adequate dispersion of pigment to yield desirable results. This is due to the fact that the finished watery vehicle does not disperse pigments properly, even when they are added to such emulsions in the form of aqueous slurries, while the original resin solutions in organic solvents at best yield only fair dispersions, which are extremely difficult to emulsify while preventing flocculation of the dispersion. As a result, high pigment concentration at workable viscosity has not heretofore been obtainable with this type of vehicle.

I have discovered that highly improved dispersion may be attained if an acid resin is admixed with a base sufficiently strong to form soaps with the resin, using sufficient base to form soap with at least one percent of the resin, but insufficient base to render the composition water-miscible. Preferably, I employ a volatile nitrogenous base such as ammonia or an amine, since I have found that much improved dispersion is obtained thereby. The vehicle thus obtained is passed through a convenient dispersion mill in admixture with the pigment; additional base is then added to make the composition water-miscible.

By the use of this method, I have been able to produce fluid compositions of high pigment concentration, and which yield coating compositions which cover well and have other desirable properties not hitherto obtainable.

Typical examples of inks made according to my invention are:

*Example 1*

| | Parts by weight |
|---|---|
| 5 lbs. cut shellac (5 lbs. shellac, 1 gal. alcohol) | 23.6 |
| Ammonium hydroxide (28% NH$_3$) | .5 |
| Water | 1.8 | are mixed, and

| | |
|---|---|
| Lithol toner | 9.0 |
| Paris white | 29.4 | are added, mixed, and ground two runs on a three-roll mill

| | |
|---|---|
| Ammonium hydroxide (28% NH$_3$) | 1.1 |
| Water | 34.6 | are mixed, and added slowly, with mixing, to the batch, which is then strained to yield a red aniline ink ready to print.

The net grinding loss based on the total ink is only about 4%.

*Example 2*

| | Parts by weight |
|---|---|
| 5 lb. cut shellac | 35.3 |
| Ammonium hydroxide (28% NH$_3$) | .7 |
| Water | 2.7 | are mixed and added to

| | |
|---|---|
| Milori blue | 27.1 |

The mixture is ground three runs on a three-roll mill, and

| | |
|---|---|
| Ammonium hydroxide (28% NH$_3$) | 1.7 |
| Water | 32.5 | previously mixed, are added to the batch to produce a blue ink, with a net grinding loss based on total ink of 6%.

It should be noted that Milori blue is used. This is a pigment which is attacked by alkali, so that it cannot be used with aqueous shellac—borax mixtures. The very high pigment concentration is also noteworthy.

*Example 3*

An ink similar to the last may be made, in which the shellac is replaced by a solution of rosin in alcohol. Improved dispersion will be obtained.

*Example 4*

A reaction product of 257 parts of tung oil, 158 parts of rosin ester gum, and 42 parts of maleic anhydride, of rather viscous consistency, is partially neutralized with ammonia water, to produce a product which is not soluble in water. This vehicle may be used to disperse pigment with notable success. When more ammonia, or morpholine, is added, the product becomes water miscible, and an ink of printing consistency can be obtained by dilution with water.

As indicated above, I may use viscous liquid materials such as maleinized tung oil, or I may, and preferably do, dissolve the resins in water miscible solvents such as ordinary alcohol. Other water miscible alcohols can be used in place of ordinary alcohol, including methanol and isopropanol; and I sometimes use a small percentage of a higher alcohol, such as butanol, where I desire to increase the press stability of my inks. I may also employ higher boiling water miscible shellac solvents such as the glycol ethers and their esters, and polyhydric alcohols.

Most pigments can be used, including many such as iron blue and chrome greens which are not fast in alkali; but care should be taken not to choose colors which are altered by ammonia.

In place of ammonia, I have used various volatile amines such as the volatile aliphatic monamines, diamines and triamines, volatile heterocyclic amines such as morpholine, and volatile hydroxy amines, which have sufficiently marked basicity to form salts with shelloic acid. The aromatic amines are, in general, unsatisfactory because they do not form salts with this acid.

The pigments need not be dispersed on a three-roll ink mill, but any type of dispersion apparatus which gives comparable results may be used. My invention merely provides such improved dispersibility that a conventional open mill can be used without substantial solvent loss.

I claim:

1. The method of making a water-miscible pigmented composition containing an acid resin which produces water-miscible soaps, which comprises preparing a liquid vehicle containing the resin partially as free resin acid and at least one per cent as a water-miscible soap thereof, but in such proportion to free resin acid that the liquid vehicle is not water-miscible, passing a mixture of said vehicle with a pigment through a dispersing machine to obtain a dispersion of pigment in said vehicle, and thereafter saponifying sufficiently more of the free resin acid with a base which produces water-miscible soaps of the resin acid to render the composition water-miscible.

2. The method of claim 1, in which the resin is liquid.

3. The method of claim 1, in which the resin is a solid, and is dissolved in a water-miscible organic solvent.

4. The method of claim 1, in which the base is a volatile nitrogenous base.

5. The method of claim 1, in which the base is ammonia.

6. The method of claim 1, in which the liquid vehicle is an alcoholic shellac solution.

ISIDOR M. BERNSTEIN.